(12) United States Patent
Jeon et al.

(10) Patent No.: US 10,732,339 B2
(45) Date of Patent: Aug. 4, 2020

(54) DISPLAY APPARATUS WITH MEANS FOR PREVENTING LIGHT LEAKAGE DUE TO A DIFFUSION PLATE SUPPORT MEMBER INSERTION HOLE

(71) Applicant: SAMSUNG ELECTRONICS CO., LTD., Suwon-si (KR)

(72) Inventors: Duk-jin Jeon, Bucheon-si (KR); Dae-young Kim, Suwon-si (KR); Hyung-ki Kim, Anyang-si (KR); Yong-sung Yoo, Suwon-si (KR); Kil-hong Lee, Suwon-si (KR); Tae-hee Jeon, Namyangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 86 days.

(21) Appl. No.: 16/058,598

(22) Filed: Aug. 8, 2018

(65) Prior Publication Data

US 2019/0121012 A1    Apr. 25, 2019

(30) Foreign Application Priority Data

Oct. 23, 2017    (KR) .......................... 10-2017-0137416

(51) Int. Cl.
G02F 1/13357    (2006.01)
F21V 8/00    (2006.01)
G09G 3/22    (2006.01)

(52) U.S. Cl.
CPC ........... *G02B 6/0025* (2013.01); *G02B 6/009* (2013.01); *G02B 6/0036* (2013.01);
(Continued)

(58) Field of Classification Search
CPC .. G02B 6/0033; G02B 6/0035; G02B 6/0036; G02B 6/004; G02B 6/0043; G02B 6/0051; G02F 1/133611
See application file for complete search history.

(56) References Cited

U.S. PATENT DOCUMENTS 5,222,795 A *  6/1993  Hed ................... G02B 6/001
                                                362/558
5,390,436 A *  2/1995  Ashall ................ G02B 6/0043
                                                40/546
(Continued)

FOREIGN PATENT DOCUMENTS

JP         2577265 Y2    7/1998
KR    10-2008-0041421 A   5/2008
(Continued)

OTHER PUBLICATIONS

Communication dated Feb. 13, 2019 issued by the European Intellectual Property Office in counterpart European Application No. 18186698.9.

*Primary Examiner* — Ismael Negron

(74) *Attorney, Agent, or Firm* — Sughrue Mion, PLLC

(57)    ABSTRACT

A display apparatus includes a display panel, a light guide plate disposed behind the display panel and configured to guide light to the display panel, a light source configured to irradiate light to at least one side of the light guide plate, a diffusion plate disposed between the display panel and the light guide plate, and at least one diffusion plate support member coupled to the light guide plate and configured to support the diffusion plate. The light guide plate includes an optical pattern arranged in a light emitting surface facing the diffusion plate and at least one insertion hole for receiving the at least one diffusion plate support member. The optical pattern includes a pattern change region which surrounds at least a portion of the insertion hole.

16 Claims, 17 Drawing Sheets

(52) U.S. Cl.
CPC ......... *G02B 6/0045* (2013.01); *G02B 6/0068* (2013.01); *G02B 6/0088* (2013.01); *G09G 3/22* (2013.01)

(56) References Cited

U.S. PATENT DOCUMENTS

| | | | | |
|---|---|---|---|---|
| 6,247,826 | B1* | 6/2001 | Funamoto | G02B 6/0038 |
| | | | | 349/63 |
| 7,278,775 | B2* | 10/2007 | Yeo | G02B 6/0041 |
| | | | | 362/19 |
| 8,511,845 | B2* | 8/2013 | Jeong | G02F 1/133603 |
| | | | | 349/61 |
| 8,807,819 | B2* | 8/2014 | Shiraishi | G02B 6/0031 |
| | | | | 362/617 |
| 8,814,391 | B2* | 8/2014 | Koh | G02B 6/0021 |
| | | | | 313/512 |
| 9,285,529 | B2* | 3/2016 | Liu | G02B 6/0033 |
| 9,575,237 | B2* | 2/2017 | Chen | G02B 6/002 |
| 9,746,709 | B2* | 8/2017 | Kim | G02B 6/0021 |
| 9,864,122 | B2* | 1/2018 | Ilmonen | G02F 1/133603 |
| 2003/0123246 | A1* | 7/2003 | Parker | A61M 21/02 |
| | | | | 362/602 |
| 2005/0242693 | A1* | 11/2005 | Hayashi | G02B 6/0036 |
| | | | | 313/110 |
| 2008/0106913 | A1 | 5/2008 | Ha | |
| 2013/0051065 | A1 | 2/2013 | Shiraishi et al. | |
| 2013/0329165 | A1 | 12/2013 | Jung et al. | |

FOREIGN PATENT DOCUMENTS

| | | |
|---|---|---|
| KR | 10-2011-0041967 A | 4/2011 |
| KR | 10-1188451 B1 | 10/2012 |
| KR | 10-1277917 B1 | 6/2013 |
| KR | 10-1281199 B1 | 7/2013 |
| WO | 2013-069142 A1 | 5/2013 |

* cited by examiner

FIG. 8A  FIG. 8B  FIG. 8C
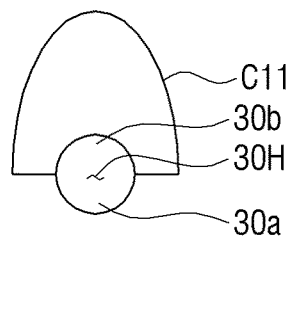
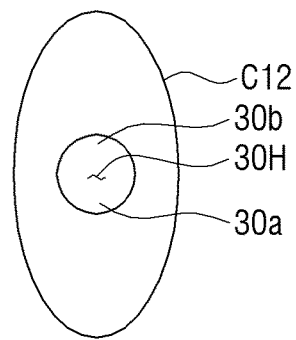
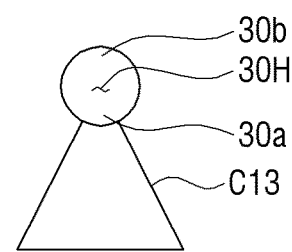

DISPLAY APPARATUS WITH MEANS FOR PREVENTING LIGHT LEAKAGE DUE TO A DIFFUSION PLATE SUPPORT MEMBER INSERTION HOLE

CROSS-REFERENCE TO RELATED APPLICATION

This application is based on and claims priority under 35 U.S.C. § 119 to Korean Patent Application No. 10-2017-0137416, filed on Oct. 23, 2017, in the Korean Intellectual Property Office, the disclosure of which is incorporated by reference herein in its entirety.

BACKGROUND

1. Field

The disclosure relates to apparatuses and methods consistent with exemplary embodiments relate to a display apparatus.

2. Description of Related Art

Display apparatuses which display images using display panels have been used in various types of apparatuses such as televisions (TVs), computer monitors, and smart phones. However, since general display apparatuses do not autonomously emit light, backlight units having separate light sources may be required. The backlight units may be disposed in rear of the display panels.

The backlight units may be divided into direct-lit type backlight units in which light sources are disposed in rear of the display panels and directly emit light to the display panels and edge-lit type backlight units which emit light toward sides of light guide plates disposed in rear of the display panels and uniformly guide the light incident on the light guide plates to the display panels through the light guide plates.

The related display apparatuses having the edge-lit type backlight units may have thicknesses smaller than those of the display apparatuses having the direct-lit backlight units in that the light sources are disposed in sides of the light guide plates, but the related display apparatuses having the edge-lit type backlight units may have limitations in that a size of the display panel is determined to have the same size as that of the light guide plate due to the structure in which a diffusion plate and the display panel are stacked on the light guide plate.

The above information is presented as background information only to assist with an understanding of the present disclosure. No determination has been made, and no assertion is made, as to whether any of the above might be applicable as prior art with regard to the present disclosure.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

In accordance with an aspect of the disclosure, a display apparatus capable of maintaining image quality and reducing a size of a light guide plate is provided.

According to an aspect of an embodiment of the disclosure, there is provided a display apparatus including a display panel; a light guide plate disposed behind the display panel and configured to guide light to the display panel; a light source configured to irradiate the light to at least one side of the light guide plate; a diffusion plate disposed between the display panel and the light guide plate; and at least one diffusion plate support member coupled to the light guide plate and configured to support the diffusion plate. The light guide plate may include: an optical pattern arranged in a light emitting surface facing the diffusion plate and at least one insertion hole which is formed in the light emitting surface for the at least one diffusion plate support member to be inserted therein. The optical pattern may include a pattern change region which surrounds at least a portion of the insertion hole.

The diffusion plate support member may include: an insertion part inserted into the insertion hole; a cover part which is in contact with the light emitting surface and covers the insertion hole; and a support part configured to support the diffusion plate. The cover part may be of a transparent material or an opaque material.

The pattern change region may include a pattern reduction region in which a pattern density is smaller than that of a remaining region of the pattern change region or a pattern increase region of which a pattern density is higher than that of a remaining region of the pattern change region.

The pattern change region may be arranged at a light source side from a center of the insertion hole to surround the portion of the insertion hole.

The insertion hole may include a first portion arranged at the light source side from the center of the insertion hole and a second portion arranged in an opposite side to the light source side. The pattern change region may surround the first portion.

The pattern change region may have a width which reduces toward the light source from the insertion hole.

The pattern change region may have a fan shape which surrounds the first portion.

The pattern change region may have a width which increases toward the light source from the insertion hole.

The pattern change region may have a triangular shape which is in contact with the insertion hole.

The pattern change region may be arranged in an opposite side to the light source from a center of the insertion hole to surround the portion of the insertion hole.

The insertion hole may include a first portion arranged at a light source side from the center of the insertion hole and a second portion arranged at the opposite side to the light source side. The pattern change region may surround the second portion.

The pattern change region may surround an outer circumference of the insertion hole.

The pattern change region may have a shape corresponding to a shape of the insertion hole and the insertion hole may be is arranged in a center portion of the pattern change region.

The light guide plate may have a quadrangular shape and include a first side, second and third sides which are coupled to the first side and face each other, and a fourth side facing the first side. The light source may include first to third light sources which irradiate the light to the first to third sides, respectively. The pattern change region may be arranged toward the first side from a center of the insertion hole and may surround the portion of the insertion hole.

The light guide plate may have a quadrangular shape and include a first side, second and third sides which are coupled to the first side and face each other, and a fourth side facing the first side. The light source may include first to third light sources and may irradiate the light to the first to third sides, respectively. The pattern change region may be arranged toward the fourth side from a center of the insertion hole and may surround the portion of the insertion hole.

Additional aspects and advantages of the exemplary embodiments are set forth in the detailed description, and will be obvious from the detailed description, or may be learned by practicing exemplary embodiments.

BRIEF DESCRIPTION OF THE DRAWING

The above and/or other aspects, features, and advantages of certain exemplary embodiments of the present disclosure will be more apparent from the following description taken in conjunction with the accompanying drawings, in which:

FIGS. 8 A-C are diagrams illustrating other modified examples of a pattern change region according to an embodiment;

DETAILED DESCRIPTION OF EXEMPLARY EMBODIMENTS

Figure 1:
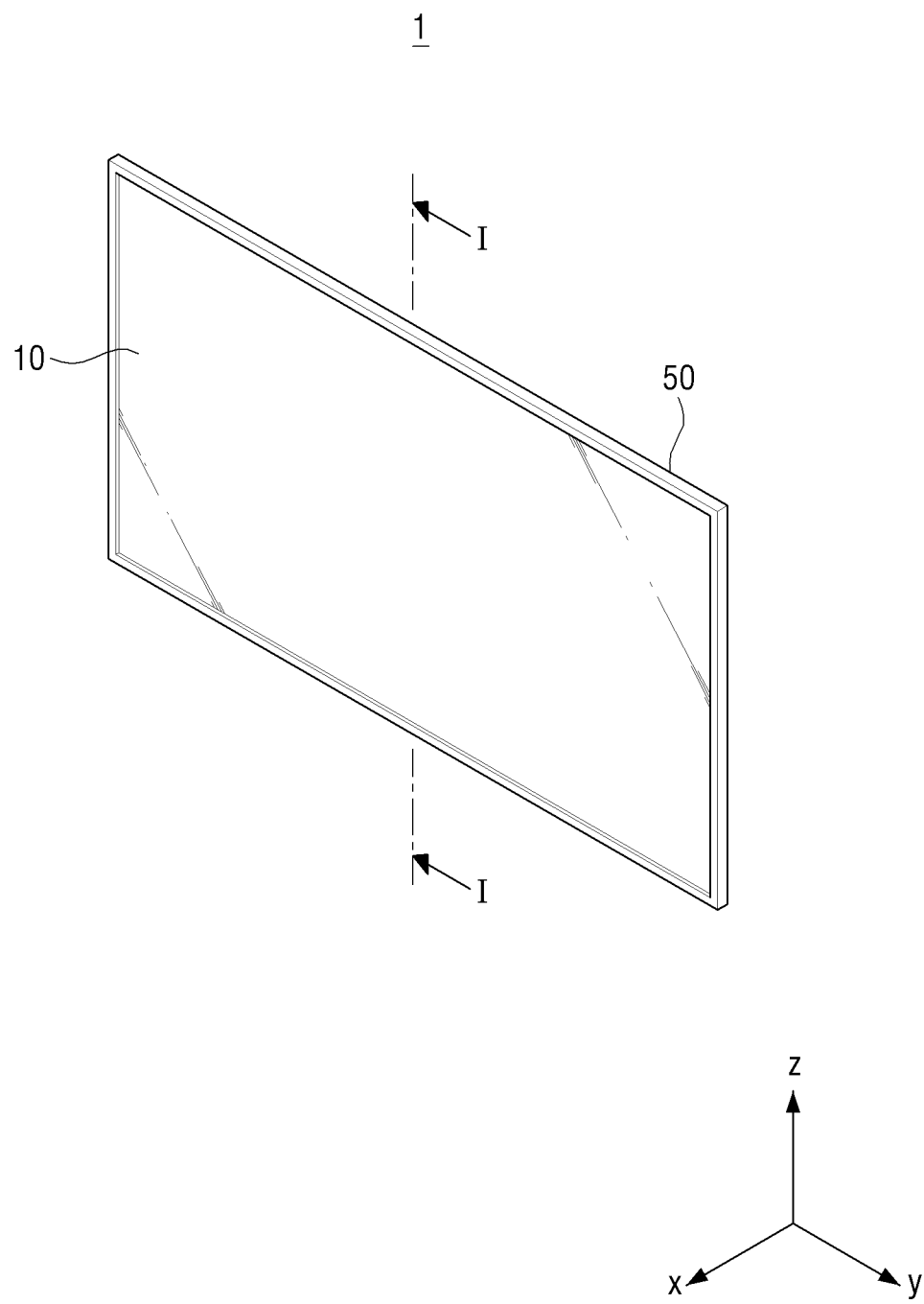
FIG. 1 is a perspective view illustrating a display apparatus according to an embodiment.

Hereinafter, exemplary embodiments of the disclosure will be described more fully with reference to the accompanying drawings, in which the exemplary embodiments of the disclosure are shown to understand a configuration and an effect of the disclosure. To more clearly describe features of the exemplary embodiments, detailed description for contents widely known to those skilled in the art will be omitted for clarity. However, in the following description, it is understood that exemplary embodiments described therein may not be limited to the technical features of an inventive concept and various modifications, equivalents, and/or alternatives of exemplary embodiments may be included therein without departing from the principles and spirit of the present disclosure.

Accordingly, the disclosure may be embodied and modified in many different forms and should not be construed as limited to exemplary embodiments set forth herein. In the following description, unless otherwise described, the same reference numerals are used for analogous elements when they are depicted in different drawings. To facilitate understanding of an inventive concept, the dimensions of partial elements may not be illustrated in the actual scale but may be exaggerated.

Figure 2:
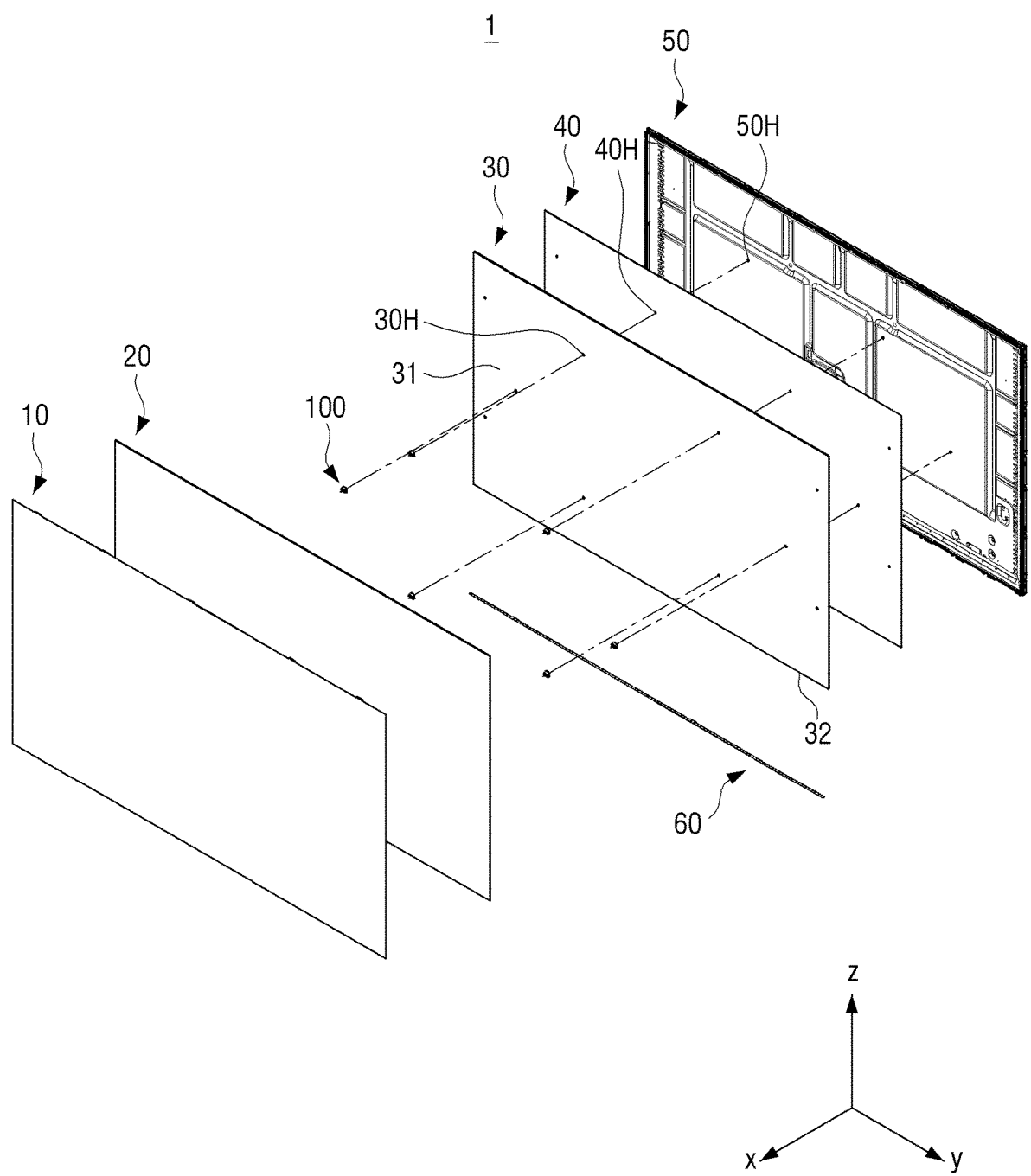
FIG. 2 is an exploded perspective view illustrating a display apparatus according to an embodiment such as the one illustrated in FIG. 1.
Figure 3:
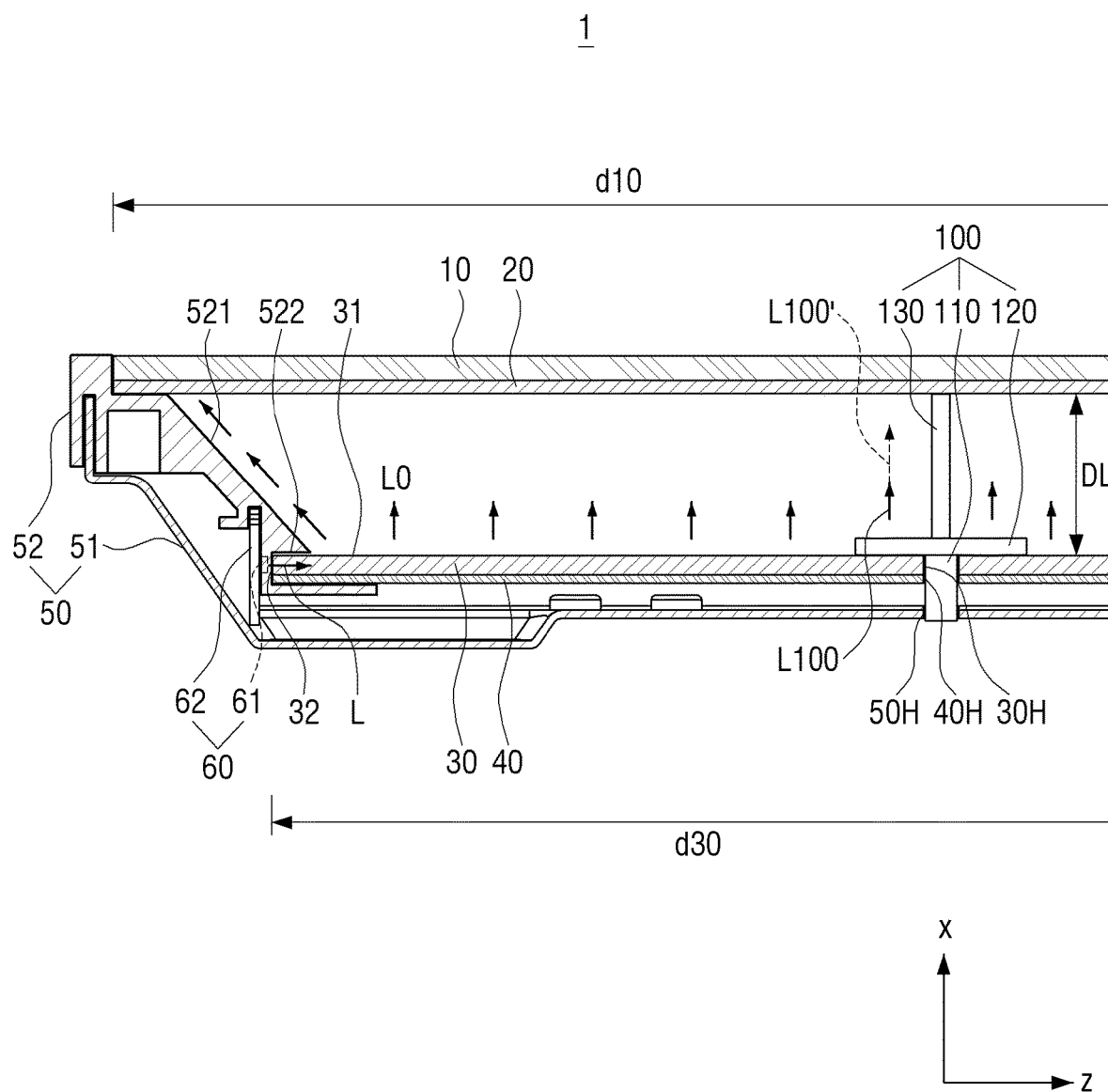
FIG. 3 is a cross-sectional diagram illustrating a portion of the display apparatus taken along line I-I of FIG. 1 according to an embodiment.

FIG. 1 is a perspective view illustrating a display apparatus according to an embodiment, FIG. 2 is an exploded perspective view illustrating a display apparatus 1 according to an embodiment such as the display apparatus illustrated in FIG. 1, and FIG. 3 is a cross-sectional diagram illustrating a portion of the display apparatus taken along line I-I of FIG. 1 according to an embodiment.

The display apparatus 1 described herein may be an apparatus which processes an image signal received from the outside and visually displays the processed image and may be implemented with various types of apparatuses, for example, a television, a monitor, a portable multimedia apparatus, a portable communication apparatus, and the like. The display apparatus 1 may be implemented with any apparatus which visually displays an image and the type of the display apparatus is not limited thereto.

As illustrated in FIGS. 1 to 3, the display apparatus 1 may include a display panel 10, a diffusion plate 20, a light guide plate 30, a reflection sheet 40, a case 50, a light source 60, and at least one diffusion plate support member 100 coupled to the light guide plate 30 and configured to support the diffusion plate 20.

The display panel 10 may display an image toward the front (X-axis direction of FIG. 1) according to an image signal input from the outside and may be configured of a liquid crystal display (LCD) panel.

Although an example that the display apparatus 1 including the display panel 10 has a rectangular shape is illustrated in FIGS. 1 to 3, the shapes of the display apparatus 1 and the display panel 10 are not limited thereto and may be modified in various shapes.

The diffusion plate 20, the light guide plate 30, the reflection sheet 40, and the case 50 may be sequentially coupled in rear of the display panel 10 and the light source 60 may be disposed close to one of sides of the light guide plate 30 and may irradiate the light toward one side of the light guide plate 30.

As illustrated in FIG. 2, the light source 60 may have a shape extending along a longitudinal direction of the light guide plate 30 and the light source 60 may be disposed close to a lower side 32 of the light guide plate 30 and irradiate the light toward the light guide plate 30.

As illustrated in FIG. 3, the one side 32 of the light guide plate 30 which is disposed to face the light source 60 and light L irradiated from the light source 60 is incident thereto may refer to a light incident part 32 of the light guide plate 30.

The light source 60 may output light (monochromatic light) of a single wavelength (single color) or light (white light) in which lights of a plurality of wavelengths are mixed.

The light source 60 may include a printed circuit board (PCB) 62 extending along the longitudinal direction of the light guide plate 30 and a plurality of light emitting devices (LEDs) 61 arranged along a longitudinal direction of the PCB 62.

The plurality of light emitting devices 61 may be arranged along the light incident part 32 of the light guide plate 30 and irradiate the lights to the light incident part 32 of the light guide plate 30.

The plurality of light emitting devices 61 may include a light emitting diode (LED), a cold cathode fluorescent lamp (CCFL), an external electrode fluorescent lamp (EEFL), a laser diode (LD), and the like.

The light guide plate 30 may guide the light incident from the light source 60 to the display panel 10 and the light guide plate 30 may convert the light incident from the light source 60 into a uniform surface light and irradiate the surface light toward the display panel 10.

For clarity, the light emitted from the light guide plate 30 is indicated by an arrow in FIG. 3.

The light guide plate 30 may emit a surface light L0 having a uniform light amount and a uniform light distribution toward the diffusion plate 20 and the display panel 10 through the light emitting surface 31 facing the diffusion plate 20 by refracting, reflecting, and scattering the light incident from the light source 60 therein.

The light guide plate 30 may be configured of poly methyl methacrylate (PMMA), polycarbonate (PC), and the like.

An optical pattern (see P of FIG. 5) may be formed in the light emitting surface 31 and the light distribution of the light irradiated through the light emitting surface 31 may be uniform through optical pattern. A detailed structure of the optical pattern P will be described later.

The diffusion plate 20 may be disposed between the display panel 10 and the light guide plate 30.

The diffusion plate 20 may be coupled to a rear surface of the display panel 10.

The diffusion plate 20 may diffuse and scatter the light emitted from the light emitting surface 31 of the light guide plate 30 and the diffusion plate 20 may allow the whole color and brightness of the screen displayed through the display panel 10 to be uniformly viewed by diffusing the light emitted from the light guide plate 30.

A prism sheet (not shown), a protection sheet (not shown), a double brightness enhancement film (DBEF) (not shown), and the like may be further coupled to the front surface or the rear surface of the diffusion plate 20.

The prism sheet and the DBEF may increase the brightness by refracting or concentrating the light diffused through the diffusion plate 20 and the protection sheet may protect the diffusion plate 20, the prism sheet, the DBEF, and components disposed in the inside of the display apparatus 1 from external shocks or foreign matters.

The reflection sheet 40 may be disposed in the rear surface of the light guide plate 30.

The reflection sheet 40 may be configured to reflect light and coupled to the rear surface of the light guide plate 30 and the reflection sheet 40 may reflect the light directing toward the rear surface of the light guide plate 30 from the inside of the light guide plate 30 to the inside of the light guide plate 30.

The reflection sheet 40 may be configured of a light reflective material, for example, polymer.

Through the reflection sheet, the light irradiated to the light incident part 32 of the light guide plate 30 from the light source 60 may be guided to the diffusion plate 20 through the light emitting surface 31 of the light guide plate 30 via the inside of the light guide plate 30. The light diffused through the diffusion plate 20 may be incident on the display panel 10 and the display panel 10 may display the incident light as an image.

The at least one diffusion plate support member 100 configured to support the diffusion plate 20 may be disposed between the light guide plate 30 and the diffusion plate 20.

The diffusion plate support member 100 may be disposed in the light emitting surface 31 of the light guide plate 30 to support the diffusion plate 20.

The light guide plate 30 and the diffusion plate 20 may be disposed to be spaced at a fixed interval through diffusion plate support member in a state that the light guide plate 30 and the diffusion plate 20 face each other and the light guide plate 30 and the diffusion plate 20 may be spaced at a fixed optical distance DL.

The diffusion plate 20 may be supported through the at least one diffusion plate support member 100 disposed in the light guide plate 30.

For example, the light guide plate 30 may include at least one insertion hole 30H to which the at least one diffusion plate support member 100 is coupled. The insertion hole 30H may penetrate the light guide plate 30.

In this example, as illustrated in FIG. 2, the light guide plate 30 may include six insertion holes 30H arranged at intervals on the light emitting surface 31.

The diffusion plate support member 100 may be configured of six diffusion plate support members 100 insertedly coupled to the six insertion holes 30H formed in the light guide plate 30.

The plurality of insertion holes 30H may be arranged radially on the basis of the center of the light emitting surface 31 and the plurality of diffusion plate support members 100 may be coupled to the plurality of insertion holes 30H and arranged radially on the basis of the center of the light emitting surface 31.

The plurality of diffusion plate support members 100 may be arranged on the light emitting surface 31 of the light guide plate 30 and coupled to the light guide plate 30 and the diffusion plate 20 may be supported through the plurality of diffusion plate support members 100.

The diffusion plate 20 may be formed to be relatively thin as compared with an area thereof. The diffusion plate 20 may be supported through the diffusion plate support member 100 in a state spaced at fixed interval from the light guide plate 30 and thus the diffusion plate 20 may be kept flat without sagging or bending.

However, the number and arrangement structure of diffusion plate support members 100 may be variously modified and the structure that the single diffusion plate support member 100 is disposed on the center of the light emitting surface 31 and supports the center portion of the diffusion plate 20 may be applied.

As illustrated in FIGS. 1 to 3, the case 50 may be coupled to a rear portion of the display apparatus 1.

The display panel 10, the diffusion plate 20, the light guide plate 30, the reflection sheet 40, and the light source 60 may be disposed in the inner side of the case 50 and the case 50 may protect from the outside and elements of the outside various types of components such as the diffusion plate 20, the light guide plate 30, the reflection sheet 40, and the light source 60 disposed inside of the display apparatus 1.

As illustrated in FIG. 3, the case 50 may include a chassis 51 and a holder 52.

The chassis 51 may be disposed in rear of the display panel 10 to form outer appearances of a rear portion and a side portion of the display apparatus 1 and surround the side of the display panel 10.

The components such as the diffusion plate 20, the light guide plate 30, the reflection sheet 40, and the light source 60 may be disposed in the inner side of the chassis 51.

The chassis 51 may prevent the components included in the display apparatus 1 from being exposed to the outside and protect the components included in the display apparatus 1 from external shocks.

The chassis 51 may be formed in a rectangular ring shape and the case 50 may further include a top chassis (not shown) provided in a display surface of the display panel 10 to prevent an edge portion of the display panel 10 from being exposed to the outside.

The holder 52 may be disposed on the inner side of the chassis 51 and may be coupled to the chassis 51.

For example, the holder 52 may support the edge portion of the display panel 10 and the edge portion of the diffusion plate 20 on the inner side of the chassis 51.

As illustrated in FIG. 3, an area of the display panel 10 may be formed to be larger than that of the light guide plate 30. Accordingly, a length d10 of the display panel 10 may be formed to be larger than a length d30 of the light guide plate 30.

An area of the diffusion plate 20 coupled to the rear surface of the display panel 10 may be the same as the area of the display panel 10 and the length of the diffusion plate 20 may also be the same as the length d10 of the display panel 10.

The holder 52 may include an inclined portion 521 inclined toward the edge portion of the diffusion plate 20 from the edge portion of the light guide plate 30.

The holder 52 may include a coupling groove 522 to which the edge portion of the light guide plate 30 is coupled.

The inclined portion 521 may guide the light emitted from the edge portion of the light emitting surface 31 to the edge portion of the diffusion plate 20 and the edge portion of the display panel 10.

The light emitted from the light emitting surface 31 may be uniformly diffused while moving the optical distance DL. The light emitted from the light emitting surface 31 may be guided through the inclined portion 521 and may be uniformly incident onto the edge portions of the diffusion plate 20 and the display panel 10.

The holder 52 may have a rectangular ring shape corresponding to the shapes of the light guide plate 30 and the diffusion plate 20 and the inclined portion 521 may be a surface shape inclined toward the edge portion of the diffusion plate 20 from the edge portion of the light guide plate 30.

The inclined portion 521 may be configured of a light reflective material and the light emitted from the light emitting surface 31 may be easily guided to the edge portion of the diffusion plate 20 through the inclined portion 521. The surface of the inclined portion 521 may be coated with a light reflective material.

As illustrated in FIG. 3, a portion of the surface light L0 emitted toward the diffusion plate 20 from the edge portion of the light emitting surface 31 may be guided along the inclined portion 521 of the holder 52 and irradiated to the edge portion of the diffusion plate 20.

Even when the areas of the diffusion plate 20 and the display panel 10 are configured to be larger than that of the light guide plate 30, the surface light L0 emitted from the light emitting surface 31 may be uniformly irradiated to the whole regions of the diffusion plate 20 and the display panel 10 through the inclined portion 521 of the holder 52.

The optical distance DL between the diffusion plate 20 and the light guide plate 30 may be formed by separating the diffusion plate 20 and the light guide plate 30 at fixed interval and the light emitted from the light emitting surface 31 may be easily guided to the diffusion plate 20 and the display panel 10 having the larger areas than the light guide plate 30 through the inclined portion 521 of the holder 52.

The light guide plate 30 may be configured to have a smaller size than those of the display panel 10 and the diffusion plate 20 by separating the light guide plate 30 and the diffusion plate 20 by the preset optical length DL and easily guiding the light irradiated from the light guide plate 30 to the edge portion of the diffusion plate 20.

Accordingly, the size of the light guide plate 30 may be reduced and the total size and weight of the display apparatus 1 may be reduced.

Figure 4:
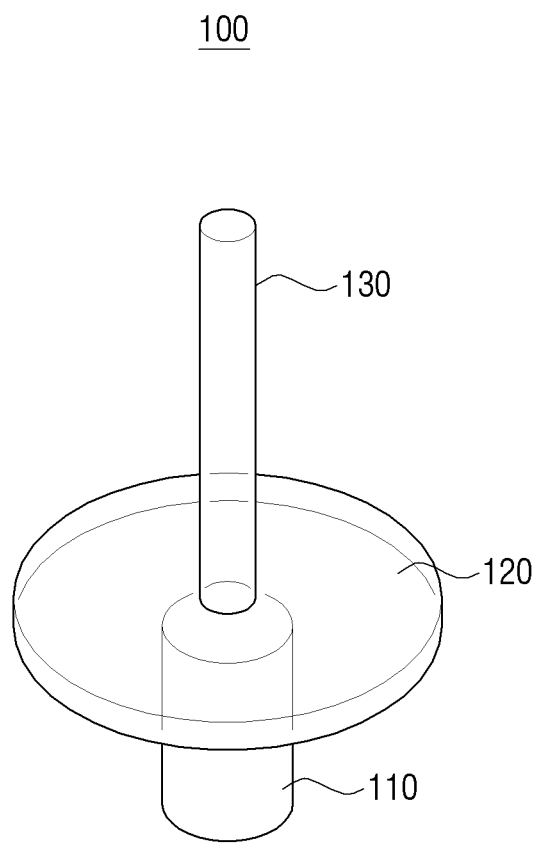
FIG. 4 is a perspective view illustrating a diffusion plate support member according to an embodiment.

FIG. 4 is a perspective view illustrating the diffusion plate support member 100 according to an exemplary embodiment.

Hereinafter, a detailed structure of the diffusion plate support member 100 and a structure that the diffusion plate support member 10 is coupled to the insertion 30H of the light guide plate 30 will be described with reference to FIGS. 3 and 4.

The diffusion plate support member 100 may include an insertion part 110, a cover part 120, and a support part 130.

The insertion part 110 may be insertedly coupled to the insertion groove 30H of the light guide plate 30 and the diffusion plate support member 100 may be coupled to the light guide plate 30 through the insertion part 110.

The insertion part 110 may protrude toward the insertion hole 30H from the center of the cover part 120 and have a columnar structure.

As illustrated in FIG. 3, the insertion part 110 may penetrate the light guide plate 30 and the reflection sheet 40 and may be insertedly coupled to the chassis 51.

The reflection sheet 40 may include a fastening hole 40H which corresponds to the insertion hole 30H of the light guide plate 30 and a portion of the insertion part 110 passing through the insertion hole 30H of the light guide plate 30 may be inserted thereinto and the case 50 may include a fastening hole 50H which the portion of the insertion part 110 passing through the fastening hole 40H of the reflection sheet 40 may be inserted thereinto.

The fastening hole 50H of the case 50 may be formed in a rear surface of the chassis 51 to correspond to the fastening hole 40H of the reflection sheet 40 and the insertion part 110 may be inserted into the fastening hole 50H.

The insertion part 110 may be insertedly coupled to the light guide plate 30, the reflection sheet 40, and the case 50 and the diffusion plate support member 100 may stably support the diffusion plate 20 in a state fixed to the light guide plate 30.

The cover part 120 may be disposed between the insertion part 110 and the support part 130 and coupled to the upper portion of the insertion part 110.

The cover part 120 may be configured to have a diameter larger than that of the insertion hole 30H to cover a periphery portion of the insertion hole 30H in a state that the cover part 120 is in contact with the light emitting surface 31. The cover part 120 may block a portion of the light emitted toward a diffusion plate 20 side through the insertion hole 30H and the periphery portion of the insertion hole 30H.

The cover part 120 may be configured of a transparent material which may block at least a portion of the light in the periphery portion of the insertion hole 30H.

However, the cover part 120 may transmit the light of the periphery portion of the insertion hole 30H without light loss.

The cover part 120 may have a plate shape in parallel to the light emitting surface 31 to cover the periphery portion of the hole insertion hole 30H and may have a disc shape or a variation of the same. Accordingly, the cover part 120 may be supported through the light guide plate 30.

A portion of the light incident on the light guide plate 30 may be emitted with a light amount larger than that of the surface light L0 through the insertion hole 30H formed in the light guide plate 30 and thus a so-called light leakage (hot spot) phenomenon may occur in the periphery of the insertion hole 30H of the light emitting surface 31.

The light amount of the light emitted through the insertion hole 30H may be larger than that of the surface light L0 emitted through the light emitting surface 31. Accordingly, a highlight portion may be formed in a position of a screen, which is displayed through the display panel 10, corresponding to the insertion hole 30H.

The highlight portion formed in the position corresponding to the insertion hole 30H and may have the brightness more than that of the periphery of the insertion hole 30H and the quality of the image displayed in the display panel 10 may be degraded.

As described above, the cover part 120 may block the portion of the light emitted from the insertion hole 30H toward the diffusion plate 20 by covering the periphery portion of the insertion hole 30H.

However, the light amount of the emitting light emitted from the insertion hole 30H may be increased toward the light source 60 and the light distribution of the emitting light emitted from the insertion hole 30H may not be uniform.

Even when the portion of the emitting light emitted from the insertion hole 30H is blocked by covering the periphery portion of the insertion hole 30H through the cover part 120, the light distribution in the periphery of the cover part 120 may lack uniformity and be uneven and irregular.

Even when the portion of the emitting light emitted from the insertion hole 30H is not blocked through the cover part 120 but is transmitted, the light distribution in the periphery of the cover part 120 may lack uniformity and be uneven.

For example, as illustrated in FIG. 3, the emitting light emitted from the insertion hole 30H may pass through the cover part 120 formed of a transparent material and may be irradiated to the diffusion plate 20.

Since the light amount of the emitting light emitted from the insertion hole 30H is increased toward the light source 60, a light amount of light L100' passing through the portion of the cover part 120 close to the light source 60 side may be larger than that of the surface light L0.

Accordingly, a highlight portion may be generated in the portion of the cover part 120 close to the light source 60 side.

An optical pattern P arranged in the light emitting surface 31 of the light guide plate 30 may include a pattern change region which surrounds at least a portion of the insertion hole 30H and the light amount and light distribution of the light passing through the cover part 120 may be matched with the light amount and light distribution of the surface light L0.

The pattern change region according to an exemplary embodiment will be described later.

The support part 130 configured to support the diffusion plate 20 may be coupled to the upper portion of the cover part 120.

The support part 130 may protrude toward the diffusion plate 20 from the center of the cover part 120 and may be in contact with the rear surface of the diffusion plate 20 to support the diffusion plate 20. The support part 130 may have a columnar shape according to an exemplary embodiment.

A diameter of the support part 130 may be configured to be smaller than that of the cover part 120 and the support part 130 may be supported through the cover part 120.

The insertion part 110, the cover part 120, and the support part 130 constituting the above-described diffusion plate support member 100 may be integrally formed and may be configured of a synthetic resin material.

Figure 5:
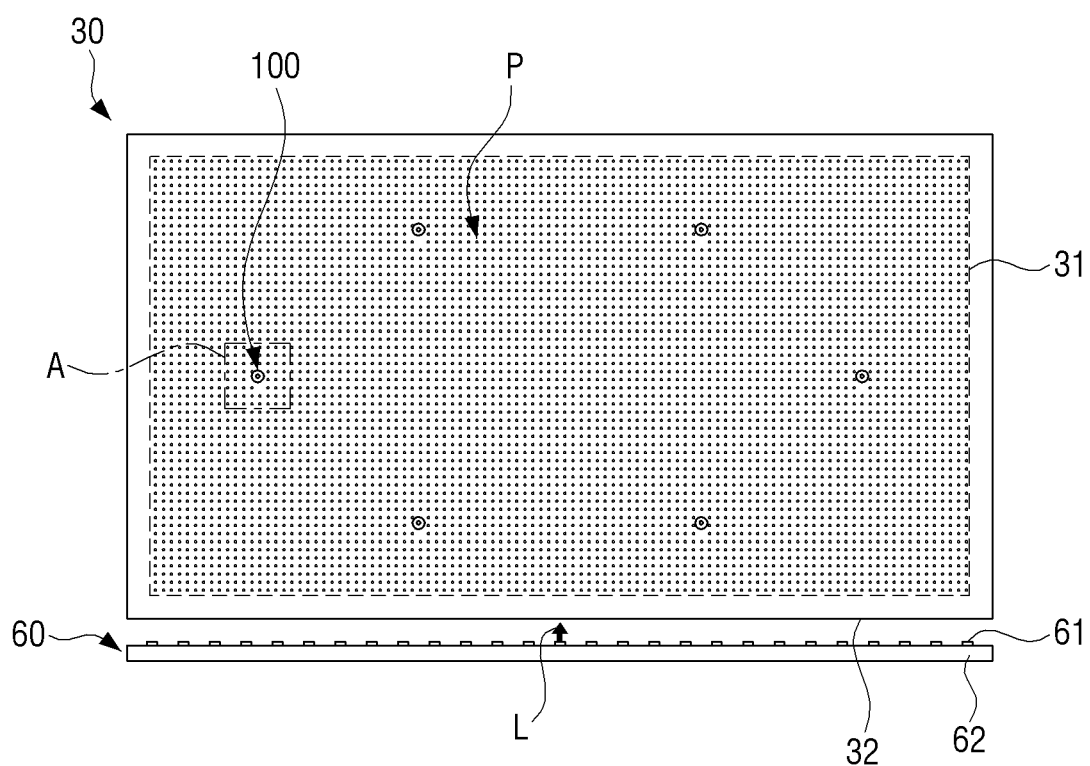
FIG. 5 is a front view illustrating a light guide plate and a light source according to an embodiment.
Figure 6:
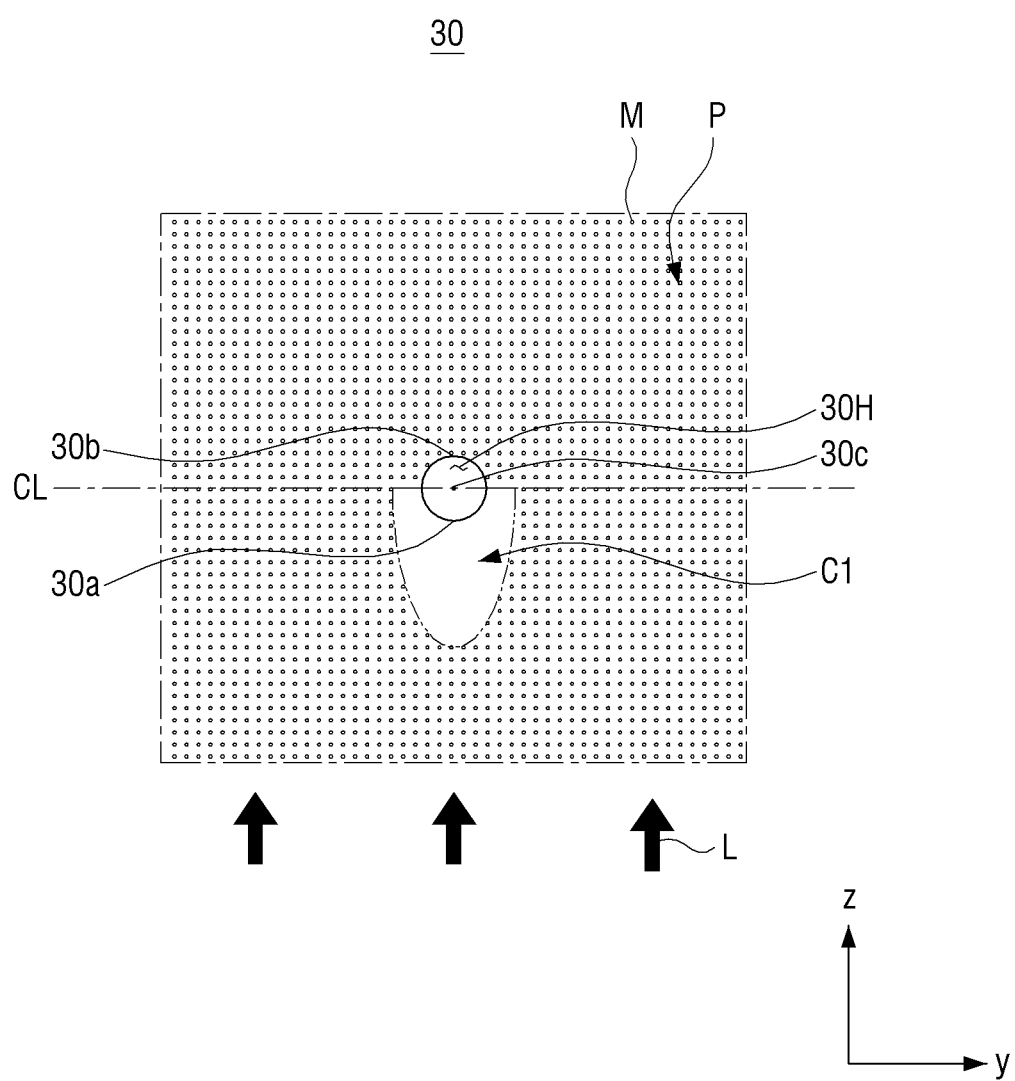
FIG. 6 is an enlarged view illustrating an A portion of the light guide plate according to an embodiment such as the one illustrated in FIG. 5.

FIG. 5 is a front view illustrating the light guide plate 30 and the light source 60 according to an exemplary embodiment and FIG. 6 is an enlarged view illustrating an A portion of the light guide plate 30 illustrated in FIG. 5 according to an exemplary embodiment.

Hereinafter, a pattern change region C1 will be described with reference to FIG. 6 according to an exemplary embodiment.

As illustrated in FIG. 5, the light guide plate 30 may include an optical pattern P arranged in the light emitting surface 31 facing the diffusion plate 20.

The light L irradiated toward the light incident part 32 of the light guide plate 30 from the light source 60 may be emitted to the diffusion plate 20 through the light emitting surface 31 via the light guide plate 30.

The optical pattern P may allow the light distribution of the light emitted to the diffusion plate 20 from the light emitting surface 31 to be uniform.

The optical pattern P may include a plurality of optical marks M (FIG. 6) and the plurality of optical marks M may have a fixed shape and a fixed size and may be arranged on the light emitting surface 31 in a fixed arrangement form or pattern.

The optical pattern P may be formed on the light emitting surface 31 through a printing process, a laser etching process, or the like. The shape, size, and arrangement of the plurality of optical marks M constituting the optical pattern P may be variously changed according to exemplary embodiments.

As illustrated in FIG. 6, the optical pattern P of the light guide plate 30 may include the pattern change region C1 which surrounds at least one portion of the insertion hole 30H.

The pattern change region C1 may be configured of the pattern reduction region C1 having a pattern density smaller than that of the remaining region of the pattern change region C1.

Figure 7:
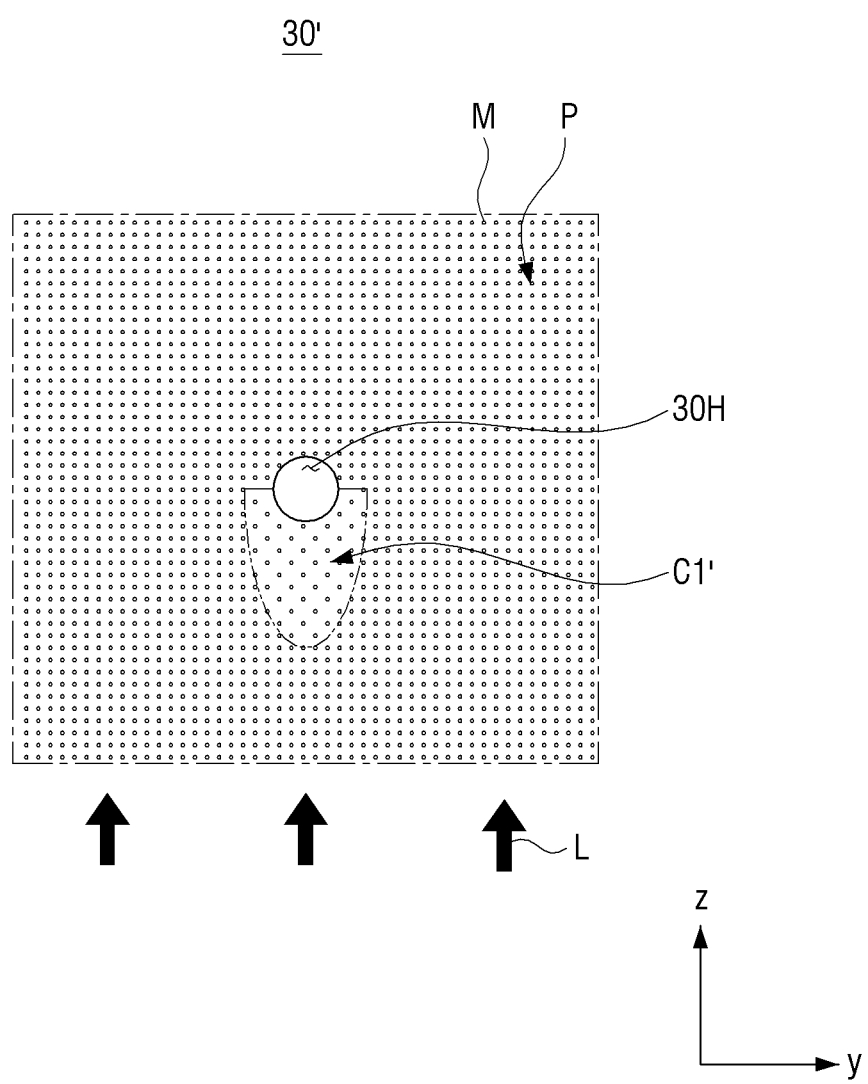
FIG. 7 is a diagram illustrating a modified example of a pattern change region according to an embodiment such as the one illustrated in FIG. 6.

For example, as illustrated in FIG. 6, the optical mark M may not be present in the pattern reduction region C1. As illustrated in FIG. 7 to be described later, the density of the optical marks M in a pattern reduction region C1' may be configured to be smaller than that of the plurality of optical marks M arranged in the remaining region.

The pattern reduction region C1 may be arranged close to the insertion hole 30H to reduce the light amount in the periphery portion of the insertion hole 30H.

For example, the pattern reduction region C1 may be arranged in the light source 60 side on the basis of the center 30c of the insertion hole 30H to surround the portion of the insertion hole 30H.

In this example, the pattern reduction region C1 may be arranged in a light incident part 32 side on the basis of the center 30c of the insertion hole 30H and arranged to a direction facing the light L irradiated from the light source 60.

The insertion hole 30H may be divided into a first portion 30a arranged in the light source 60 side on the basis of the center 30c of the insertion hole 30H and a second portion 30b arranged on an opposite side of the light source 60.

The first portion 30a and the second portion 30b of the insertion hole 30H may be partitioned on the basis of an imaginary line CL, which is in parallel to the light incident part 32 of the light guide plate 30 and passes through the center of the insertion hole 30H.

The pattern reduction region C1 may surround the first portion 30a of the insertion hole 30H to reduce the light amount in the periphery of the first portion 30a.

Referring back to FIG. 3, since the light amount of the emitting light emitted from the insertion hoe 30H is increased toward the light source 60, the light amount of the light L100' passing through the portion of the cover part 120 close to the light source 60 side may be larger than that of the surface light L0. For example, the light amount of the light L100' in the periphery of the first portion 30a of the insertion hole 30H may be larger than that of the surface light L0 and a highlight portion may be generated in the periphery of the first portion 30a.

The pattern reduction region C1 may surround the first portion 30a of the insertion hole 30H. The pattern reduction region C1 may reduce the light amount in the periphery of the first portion 30a and thus the light amount of the light L100 passing through the portion of the cover part 120 close to the light source 60 side may be matched with the light amount of the surface light L0. For example, the pattern reduction region C1 may reduce the light amount of the light L100 in the periphery of the first portion 30a of the insertion hole 30H to be matched with the light amount of the surface light L0.

Since the light amount and light distribution of the light in the periphery of the diffusion plate support member 100 are matched with the uniform light amount and light distribution of the surface light L0 irradiated from the light emitting surface 31 through the pattern reduction region C1, the generation of the highlight portion by the insertion hole 30H may be prevented.

The pattern reduction region C1 may be configured to have a shape that a width of the pattern reduction region C1 is gradually reduced toward the light source 60 from the insertion hole 30H.

For example, as illustrated in FIG. 6, the pattern reduction region C1 may have a fan shape which surrounds the first portion 30a or a variation of a fan or fan's blade shape. The pattern reduction region C1 may have a half-elliptic shape extending toward the light source 60 or a variation of the half-elliptic shape.

Accordingly, the pattern reduction region C1 may uniformly reduce the light amount of the emitting light emitted radially from the first portion 30a of the insertion hole 30H.

FIG. 7 is a diagram illustrating a modified example of the pattern change region illustrated in FIG. 6 according to an exemplary embodiment.

A configuration of a light guide plate 30' including the pattern change region C1' illustrated in FIG. 7 may be mostly analogous to that of the light guide plate 30 illustrated in FIG. 6, but the configuration of the light guide plate 30' may be different from the configuration of the light guide plate 30 in that the pattern change region C1' includes the optical marks M.

The optical pattern P of the light guide plate 30' may include the pattern change region C1' which surrounds at least a portion of the insertion hole 30H.

The pattern change region C1' may include the plurality of optical marks M and may be configured of a pattern reduction region C1' of which the pattern density is smaller than that of the remaining region of the pattern change region C1'.

The pattern reduction region C1' may be configured to have the smaller density of the optical marks M than the plurality of optical marks M arranged in the remaining region and the light amount in the periphery portion of the insertion hole 30H may be reduced.

The pattern reduction region C1' may surround the first portion 30a of the insertion hole 30H to reduce the light amount in the periphery of the first portion 30a. The pattern reduction region C1' may reduce the light amount in the periphery of the first portion 30a of the insertion hole 30H to be matched with that of the surface light L0.

The pattern reduction region C1' may have a fan shape which surrounds the first portion 30a or a variation of a fan or fan's blade shape and may have a half-elliptic shape extending toward the light source 60 or a variation of the half-elliptic shape.

The optical pattern P may include the pattern reduction regions C1 and C1' which surround at least a portion of the insertion hole 30H and the pattern reduction regions C1 and C1' may prevent the highlight portion by the emitting light emitted through the insertion hole 30H from being formed in the periphery of the diffusion plate support member 100.

FIGS. 8A-8C are diagrams illustrating other modified examples of a pattern change region according to an exemplary embodiment.

Although an example of the structure which prevents the highlight portion from being generated in the periphery of the first portion 30a of the insertion hole 30H by arranging the pattern reduction regions C1 and C1' to surround the first portion 30a of the insertion hole 30H is illustrated in FIGS. 6 and 7, the shape of the pattern change region configured of the pattern reduction region may be changed in various ways as illustrated in FIGS. 8A-8C.

As illustrated in FIG. 8A, a pattern reduction region C11 may be arranged in an opposite side to the light source 60 on the basis of the center of the insertion hole 30H to surround a portion of the insertion hole 30H.

For example, the patter reduction region C11 may reduce the light amount in the periphery of the second portion 30b by surrounding the second portion 30b of the insertion hole 30H.

The light distribution of the emitting light emitted from the insertion hole 30H may be variously changed according to one or more structural changes in the light guide plate, the reflection sheet, the light source, and the diffusion plate support member, and thus the highlight portion may be generated in the periphery portion of the second portion 30b of the insertion hole 30H.

As the pattern reduction region C11 may be arranged to surround the second portion 30b of the insertion hole 30H, the light amount in the periphery of the second portion 30b may be reduced and the generation of the highlight portion in the periphery of the second portion 30b may be prevented.

The pattern reduction region C11 may be configured in a shape that a width of the pattern reduction region C11 is gradually reduced in a direction, shown by an arrow L, away from the light source 60 (toward an opposite direction to the light source 60) from the insertion hole 30H. For example, the pattern reduction region C11 may have a fan shape which surrounds the second portion 30b or a variation of a fan or fan's blade shape, or may have a half-elliptic shape extending in the opposite direction from the light source 60, shown by an arrow L or a variation of the half-elliptic shape.

As illustrated in FIG. 8B, a pattern reduction region C12 may have a shape which surrounds an outer circumference of the insertion hole 30H. The pattern reduction region C12 may have a shape which surrounds the periphery portion of the insertion hole 30H.

Accordingly, the insertion hole 30 may be arranged in a center portion of the pattern reduction region C12 and the light amount of the emitting light emitted from the insertion hole 30H may be reduced. The light amount in the periphery portion of the insertion hole 30H may be entirely reduced through the pattern reduction region C12.

As described above, the light amount and light distribution of the emitting light emitted from the insertion hole 30H may be changed in various ways. When the highlight portion is generated along an outer circumference (entire periphery) of the insertion hole 30H, the highlight portion in the periphery portion of the insertion hole 30H may be removed through the pattern reduction region C12 which surrounds the insertion hole 30H.

The pattern reduction region C12 may be configured in a shape corresponding to the shape of the insertion hole 30H and the pattern reduction region C12 may have a circular shape corresponding to the shape of the insertion hole 30H.

The pattern reduction region C12 may have an elliptic shape extending to a direction facing the light source 60 and may have an elliptic shape extending along a light path of the light irradiated from the light source 60.

As illustrated in FIG. 8C, a pattern reduction region C13 may be arranged in the light source 60 side on the basis of the center of the insertion hole 30H to surround a portion of the insertion hole 30H and may have a shape that a width of the pattern reduction region C13 is increased toward the light source 60 from the insertion hole 30H.

For example, the pattern reduction region C13 may have a triangular shape that any one of vertices is in contact with the insertion hole 30H or a variation of the triangular shape with any one of the vertices in contact with the insertion hole 30H.

The emitting light emitted from the insertion hole 30H may be diffused radially on the basis of the insertion hole 30H.

Accordingly, the pattern reduction region C13 may be configured in a radial shape that a width of the pattern reduction region C13 is increased toward the light source 60 from the insertion hole 30H and may uniformly reduce the light amount of the emitting light emitted radially from the first portion 30a.

Although the examples that the optical mark M not being included in the pattern reduction regions C11, C12, and C13 illustrated in FIGS. 8A to 8C, respectively, the pattern reduction regions C11, C12, and C13 may include the plurality of optical marks M arranged therein and may be configured to have a pattern density smaller than those of the remaining regions of the pattern reduction regions C11, C12, and C13.

Other than the structures and shapes described above, the structure and shape of the pattern reduction region may be changed in various ways according to exemplary embodiments.

Figure 9:
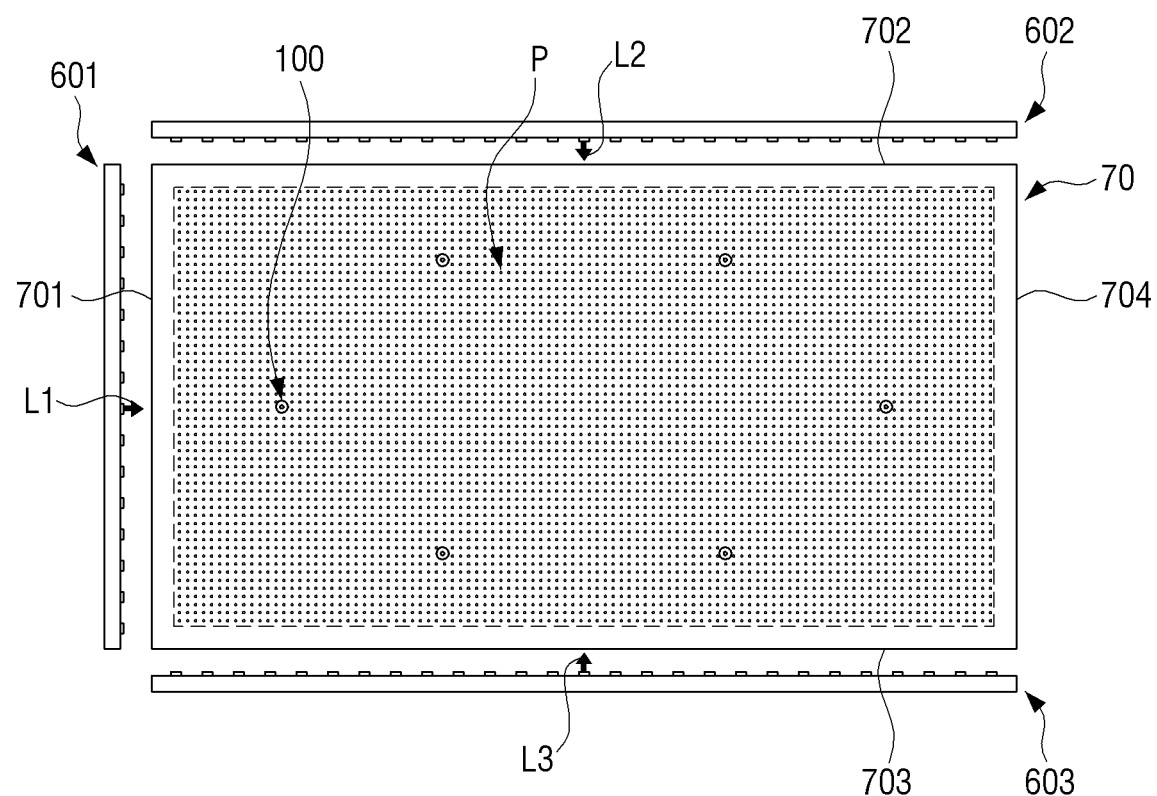
FIG. 9 is a front view illustrating a light guide plate and a light source according to another embodiment.
Figures 10A, 10B, 10C:
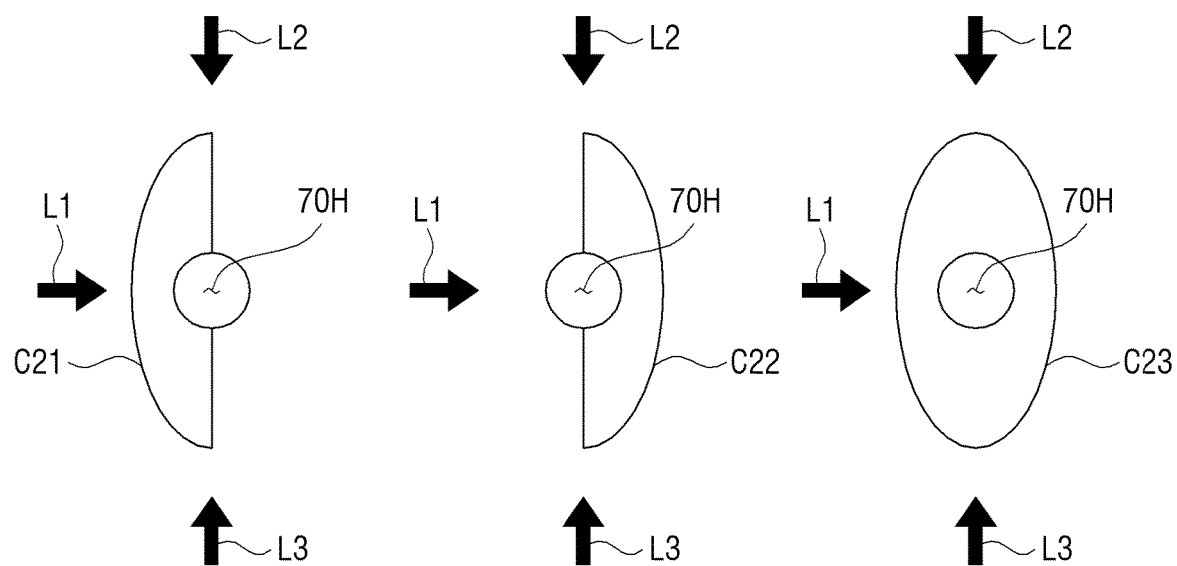
FIGS. 10A-10C are diagram illustrating examples of a pattern change region according to another embodiment.

FIG. 9 is a front view illustrating a light guide plate 70 and light sources 601, 602, and 603 according to another exemplary embodiment and FIGS. 10A-10C are diagrams illustrating examples of a pattern change region according to another exemplary embodiment.

The light guide plate 30 and the light source 60 illustrated in FIGS. 2 and 3 may be replaced with the light guide plate 70 and the light sources 601, 602, and 603, as illustrated in FIG. 9.

The light guide plate 70 having a quadrangular shape may include a first side 701, a second side 702 and a third side 703 coupled to the first side 701 and facing each other, and a fourth side 704 facing the first side 701.

The light sources 601, 602, and 603 may include first to third light source units 601, 602, and 603 configured to irradiate lights to the first to third sides 701, 702, and 703.

The first light source unit 601 may irradiate a first light L1 toward the first side 701, the second light source unit 602 may irradiate a second light L2 toward the second side 702, and the third light source unit 603 may irradiate a third light L3 toward the third side 703.

The first to third lights L1 to L3 may be irradiated to the first to third sides 701, 702, and 703 of the light guide plate 70 and the light amount of the light guided toward the diffusion plate 20 from the light guide plate 70 may be increased.

The light guide plate 70 may include a plurality of insertion holes 70H and a plurality of diffusion plate support members 100 may be coupled to the plurality of insertion holes 70H.

As illustrated in FIGS. 10A to 10C, the optical pattern P may include pattern change regions C21, C22, and C23 which surround at least portions of the insertion holes 70H.

The pattern change regions C21, C22, and C23 may be configured of pattern reduction regions C21, C22, and C23 having pattern densities smaller than those of the remaining regions of the pattern change regions C21, C22, and C23 and may include no optical mark M.

As illustrated in FIG. 10A, the pattern reduction region C21 may be arranged toward the first side 701 on the basis of the center of the insertion hole 70H to surround the portion of the insertion hole 70H.

The first to third lights L1 to L3 may be incident on the light guide plate 70 through the first to third sides 701, 702, and 703, and the light amount of the light irradiated toward the insertion hole 70H may be maximized in a portion of the insertion hole 70H facing the first side 701.

Accordingly, the generation of the highlight portion in the periphery portion of the insertion hole 70H facing the first side 701 may be prevented through the pattern reduction region C21.

The pattern reduction region C21 may be configured in a shape that a width of the pattern reduction region C21 is gradually reduced toward the first side 701 from the insertion hole 70H.

For example, the pattern reduction region C21 may have a fan shape which surrounds the portion of the insertion hole 70H or a variation of fan or fan blade shape. The pattern reduction region C21 may have a half-elliptic shape extending toward the second and third light sources L2 and L3 or a variation of the half-elliptic shape.

As illustrated in FIG. 10B, the pattern reduction region C22 may be arranged toward the fourth side 704 on the basis of the center of the insertion hole 70H to surround the portion of the insertion hole 70H.

The pattern reduction region C22 may be configured in a shape that a width of the pattern reduction region C22 is gradually reduced toward the fourth side 704 from the insertion hole 70H.

For example, the pattern reduction region C22 may have a fan shape which surrounds the portion of the insertion hole 70H or a variation of the fan or fan's blade shape. The pattern reduction region C22 may have a half-elliptic shape extending toward the second and third light sources L2 and L3 directions or a variation of the half-elliptic shape.

Accordingly, the highlight portion which may be generated in the periphery portion of the insertion hole 70H facing the fourth side 704 may be removed through the pattern reduction region C22.

As illustrated in FIG. 10C, the pattern reduction region C23 may have a shape which surrounds an outer circumference of the insertion hole 70H. The pattern reduction region C23 may have a shape which entirely surrounds a periphery portion of the insertion hole 70H.

The highlight portion which may be generated along the outer circumference of the insertion hole 70H may be removed through the pattern reduction region C23.

The light may be irradiated to a plurality of sides of the light guide plate 70 and the highlight portion may be generated in various positions of the periphery portion of the insertion hole 70H. However, the highlight portion may be removed through the pattern reduction region having various shapes.

Figure 11:
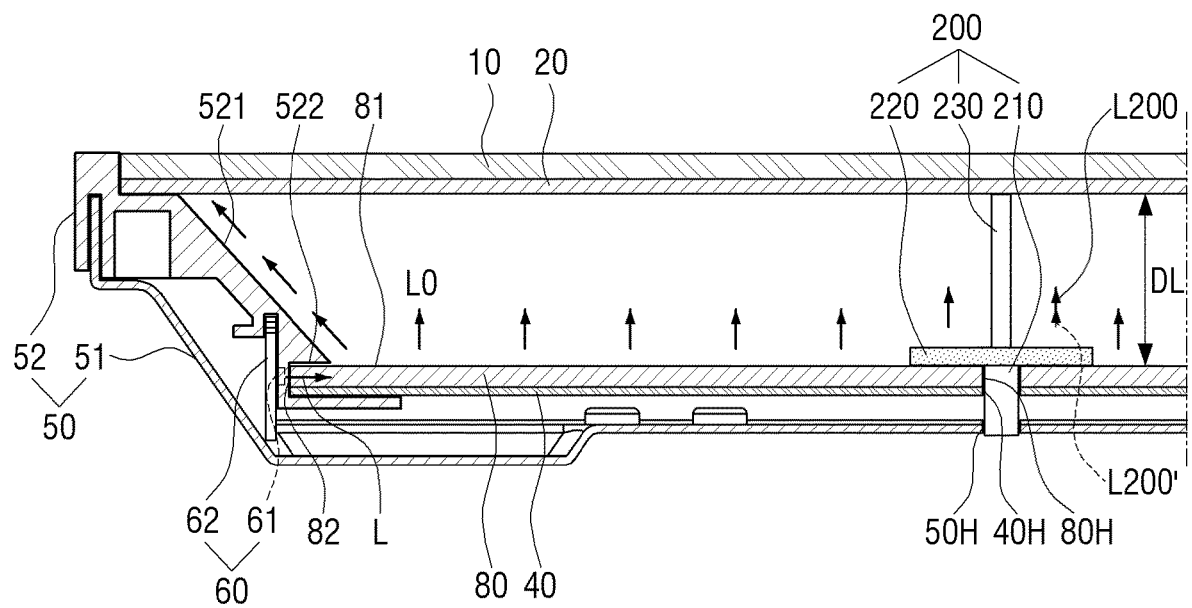
FIG. 11 is a cross-sectional diagram illustrating a display apparatus according to another embodiment.
Figure 12:
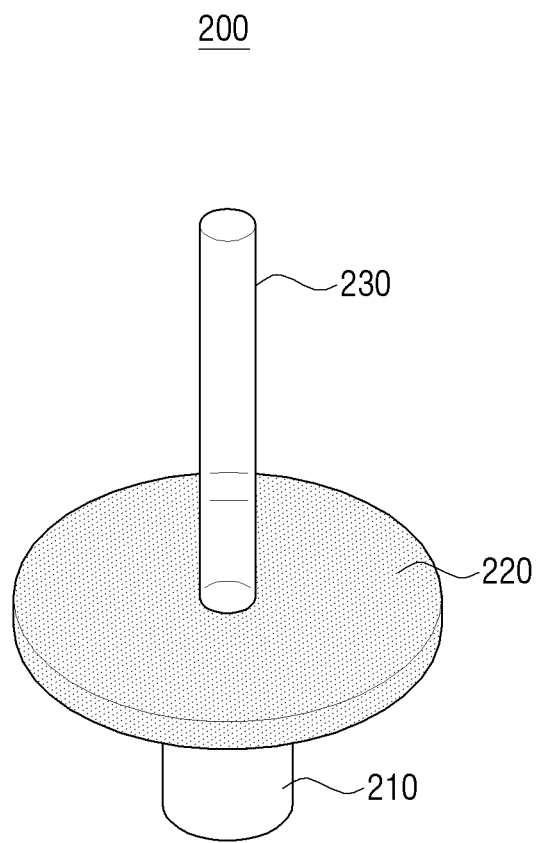
FIG. 12 is a perspective view illustrating a diffusion plate support member according to another embodiment.

FIG. 11 is a cross-sectional diagram illustrating a display apparatus according to another exemplary embodiment and FIG. 12 is a perspective view illustrating a diffusion plate support member according to another exemplary embodiment.

A configuration of the display apparatus 2 according to another exemplary embodiment may be mostly analogous to that of the display apparatus 1 illustrated in FIG. 3 and thus detailed description for a portion of the display apparatus 2 overlapping the display apparatus 1 will be omitted and hereinafter, the structure of the diffusion plate support member 200 and a light guide plate 80 will be mainly described.

The diffusion plate support member 200 may include an insertion part 210, a cover part 220, and a support part 230.

The insertion part 210 may be insertedly coupled (coupled via insertion) to the insertion groove 80H of the light guide plate 80. The cover part 220 may cover a periphery portion of the insertion hole 80H in a state that the cover part 220 is in contact with a light emitting surface 81. The support part 230 may protrude toward the diffusion plate 20 on the basis of the center of the cover part 220 to support the diffusion plate 20.

The cover part 220 may be configured of an opaque material and have a disc shape. The cover part 220 may block a portion of the light emitted toward the diffusion plate 20 from the insertion hole 80H by covering the periphery portion of the insertion hole 80H.

As described above, according to an exemplary embodiment, the light amount of the emitting light emitted from the insertion hole 80H may be increased toward the light source 60 and the light distribution of the emitting light emitted from the insertion hole 80H may not be uniform.

Accordingly, the light distribution of the light irradiated to the diffusion plate 20 through the cover part 220 formed of an opaque material may be not uniform and unevenly distributed.

For example, as illustrated in FIG. 11, the light amount of the emitting light emitted from the insertion hole 80H may be reduced far away from the light source 60 and a light amount of a light L200' passing through a portion of the cover part 220 arranged in an opposite side to the light source 60 may be smaller than that of the surface light L0.

Accordingly, a shadow portion in the periphery of the portion of the cover part 220 arranged in the opposite side to the light source 60 may be generated.

Figure 13:
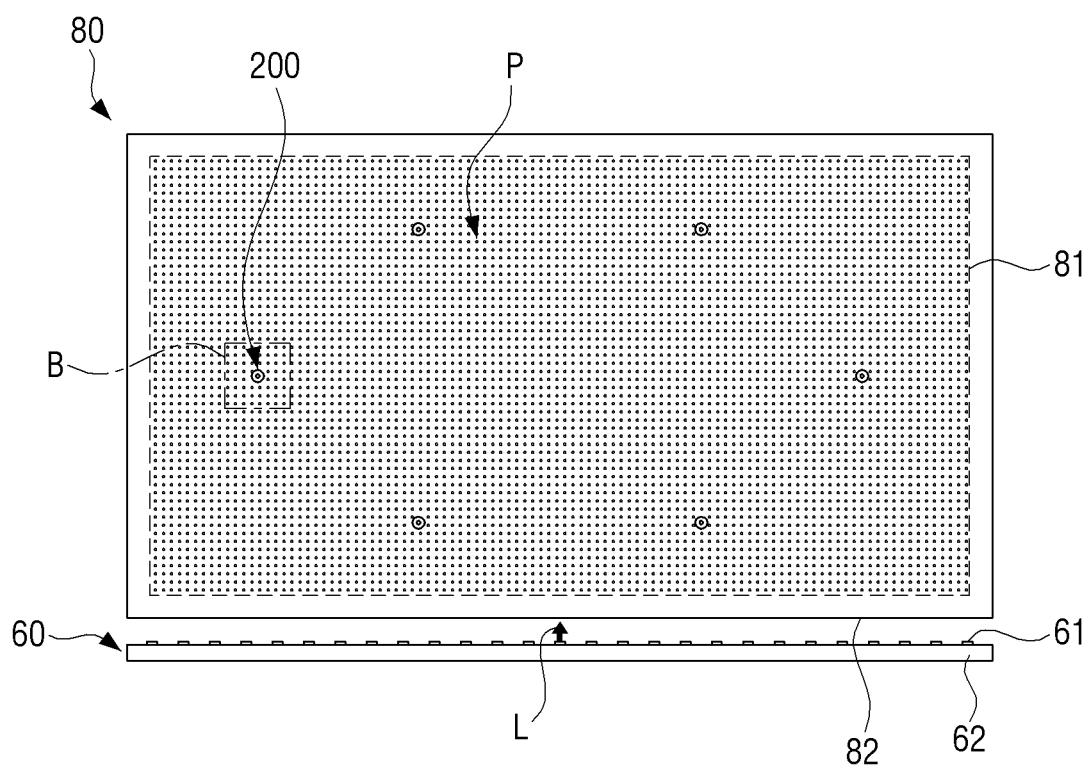
FIG. 13 is a front view illustrating a light guide plate and a light source according to another embodiment.
Figure 14:
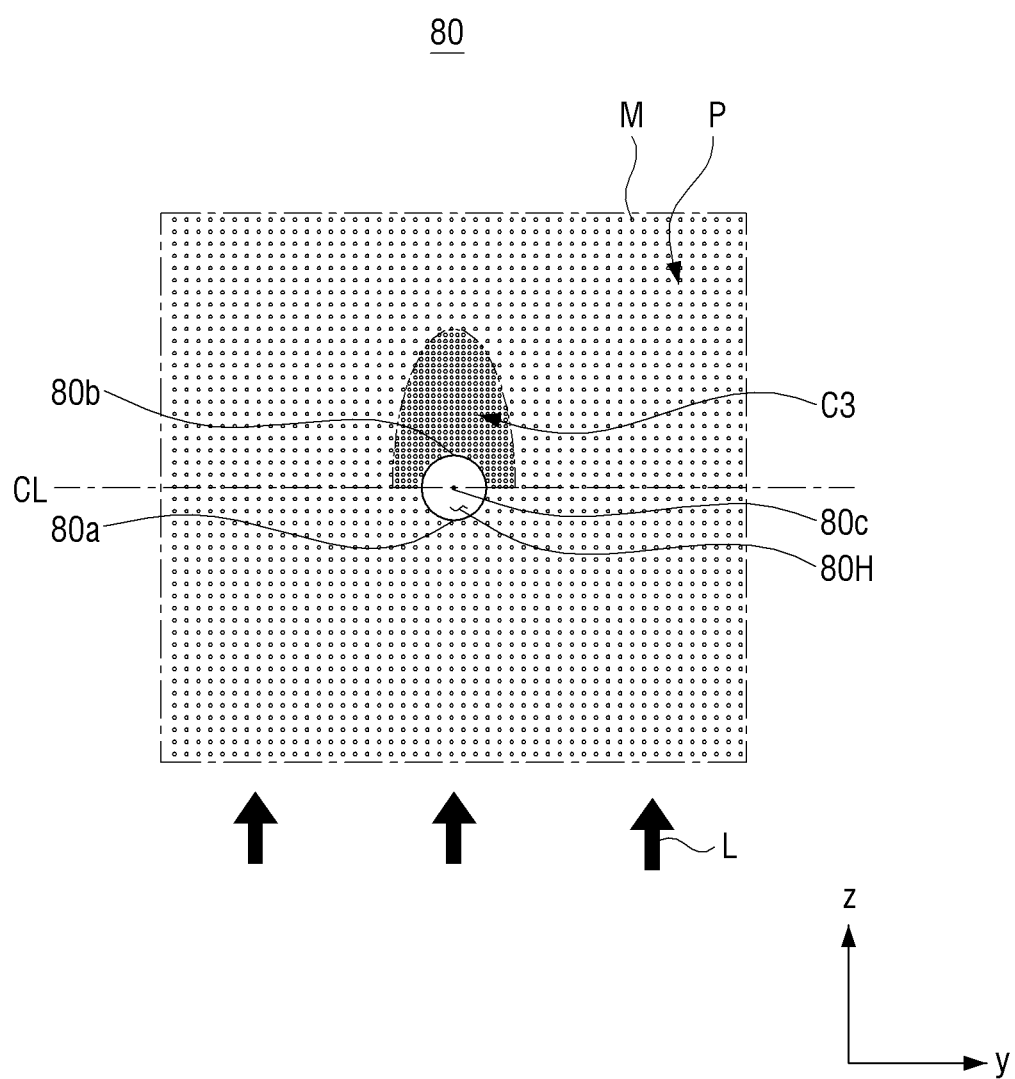
FIG. 14 is an enlarged view illustrating a B portion of the light guide plate according to another embodiment such as the one illustrated in FIG. 13.

FIG. 13 is a front view illustrating the light guide plate 80 and the light source 60 according to another exemplary embodiment and FIG. 14 is an enlarged view illustrating a B portion of the light guide plate 80 illustrated in FIG. 13 according to another exemplary embodiment.

As illustrated in FIG. 13, the light guide plate 80 may include the optical pattern P arranged in the light emitting surface 81 facing the diffusion plate 20.

The optical pattern P may include a plurality of optical marks M and the plurality of optical marks M (FIG. 14) which may have a fixed shape and a fixed size and may be arranged on the light emitting surface 81 in a fixed arrangement form or pattern.

As illustrated in FIG. 14, the optical pattern P of the light guide plate 80 may include the pattern change region C3 which surrounds at least a portion of the insertion hole 80H.

The pattern change region C3 may be configured of a pattern increase region C3 having a higher density pattern than that of the remaining region of the pattern P.

For example, as illustrated in FIG. 14, the pattern increase region C3 may be configured to have the density of the optical marks M larger than that of the plurality of optical marks M arranged in the remaining region.

The pattern increase region C3 may be arranged close to the insertion hole 80H to increase the light amount in the periphery portion of the insertion hole 80H.

For example, the pattern increase region C3 may be arranged in an opposite side of the light source 60 on the basis of a center 80c of the insertion hole 80H to surround the portion of the insertion hole 80H.

In this example, the pattern increase region C3 may be arranged in an opposite side to a light incident part 82 on the basis of the center 80c of the insertion hole 80H.

The insertion hole 80H may be divided into a first portion 80a arranged in the light source 60 side on the basis of the center 80c of the insertion hole 80H and a second portion 80b arranged in an opposite side to the light source 60.

The first portion 80a and the second portion 80b of the insertion hole 80H may be partitioned on the basis of the imaginary line CL which is in parallel to the light incident part 82 of the light guide plate 80 and passes through the center of the insertion hole 80H.

The pattern increase region C3 may surround the second portion 80b of the insertion hole 80H to increase the light amount in the periphery of the second portion 80b.

As described above, since the light amount of the emitting light emitted from the insertion hoe 80H is reduced far away from the light source 60, the light amount of the light L200' passing through the portion of the cover part 220 arranged in the opposite side to the light source 60 may be smaller than that of the surface light L0. Accordingly, the shadow portion may be generated in the periphery portion of the second portion 80b.

The pattern increase region C3 may surround the second portion 80b of the insertion hole 80H to increase the light amount in the periphery of the second portion 80b and the light amount of the light L200 passing through the portion of the cover part 220 close to opposite side to the light source 60 may be matched with the light amount of the surface light L0 through the pattern increase region C3. For example, the pattern increase region C3 may increase the light amount of the light L200 in the periphery of the second portion 80b of the insertion hole 80H to be matched with the light amount of the surface light L0.

Since the light amount and light distribution of the light in the periphery of the diffusion plate support member 200 are matched with those of the surface light L0 through the pattern increase region C3, the generation of the shadow portion by the diffusion plate support member 200 coupled to the insertion hole 80H may be prevented.

The pattern increase region C3 may be configured to have a shape that a width of the pattern increase region C3 is gradually reduced to an opposite direction to the light source 60 from the insertion hole 80H.

For example, as illustrated in FIG. 14, the pattern increase region C3 may have a fan shape which surrounds the second portion 80b or a variation of a fan or fan's blade shape and may have a half-elliptic shape extending to the opposite direction to the light source 60 or a variation of the half-elliptic shape.

Figures 15A, 15B, 15C:
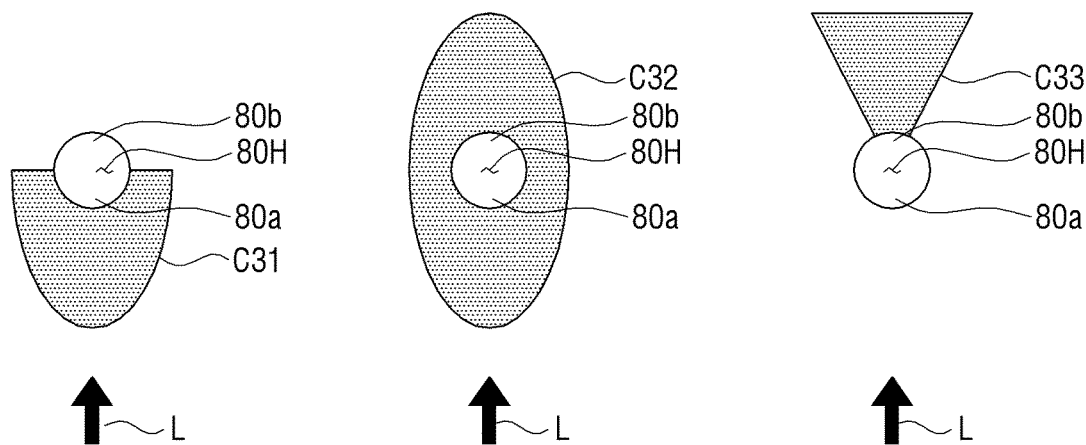
FIGS. 15A-C are diagrams illustrating modified examples of a pattern change region according to another embodiment such as the one illustrated in FIG. 14.

FIGS. 15A-15C are diagrams illustrating modified examples of the pattern change region illustrated in FIG. 14 according to another exemplary embodiment.

As illustrated in FIG. 15A, a pattern increase region C31 may be arranged in the light source 60 side on the basis of the center of the insertion hole 80H to surround a portion of the insertion hole 80H.

The light distribution of the emitting light emitted from the insertion hole 80H may be changed in various ways according to the structure change in the light guide plate, the reflection sheet, the light source, and the diffusion plate support member and thus the shadow portion may be generated in the periphery of the first portion 80a of the insertion hole 80H.

The pattern increase region C31 may surround the first portion 80a of the insertion hole 80H to increase the light amount in the periphery of the first portion 80a.

The generation of the shadow portion in the periphery of the first portion 80a may be prevented through the pattern increase region C31.

As illustrated in FIG. 15B, a pattern increase region C32 may have a shape which surrounds an outer circumference of the insertion hole 80H. The pattern increase region C32 may have a shape which surrounds the periphery portion of the insertion hole 80H.

As described above, the light amount and light distribution of the emitting light emitted from the insertion hole 80H may be changed in various ways and when the shadow portion is generated along the outer circumference (entire periphery) of the insertion hole 80H, the shadow portion may be removed by surrounding the periphery portion of the insertion hole 80H through the pattern increase region C32.

As illustrated in FIG. 15C, a pattern increase region C33 may have a triangular shape that a width of the pattern reduction region C33 is increased toward the opposite direction to the light source 60 from the insertion hole 80H.

Other than the structures and shapes described above, the structure and shape of the pattern increase region may be changed in various ways.

Figure 16:
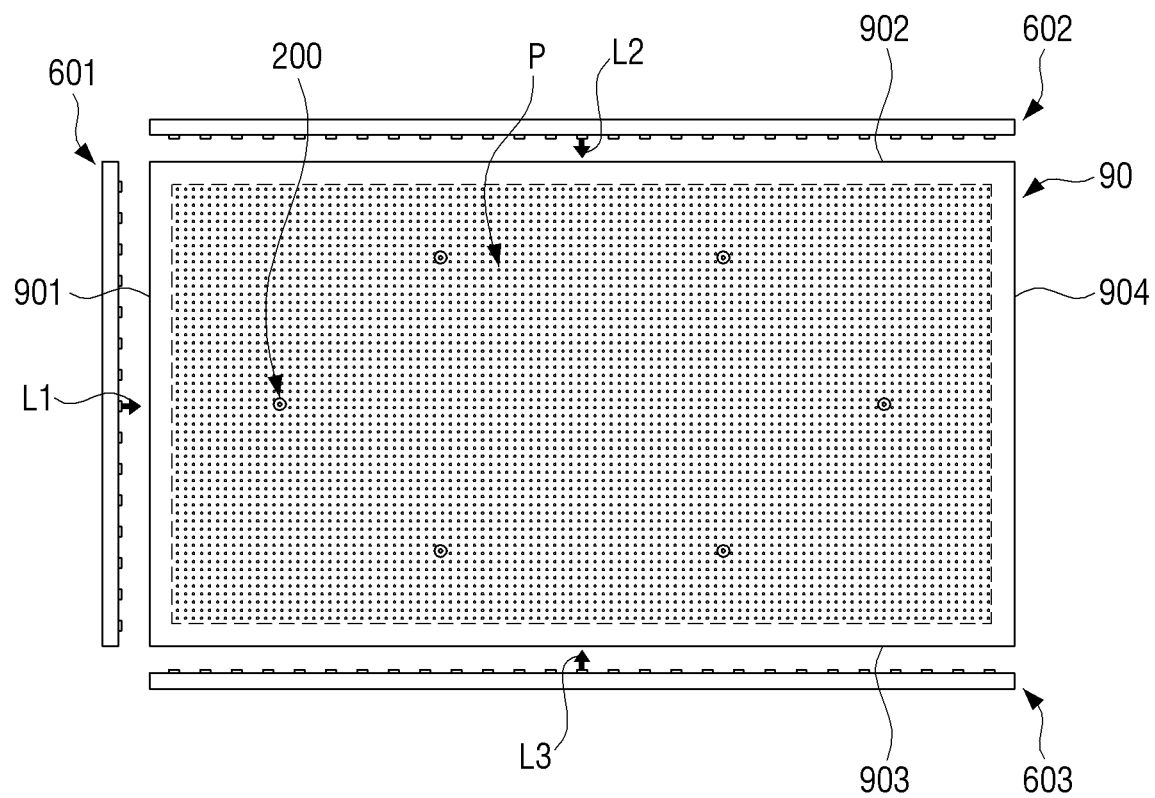
FIG. 16 is a front view illustrating a light guide plate and a light source according to another embodiment.
Figures 17A, 17B, 17C:
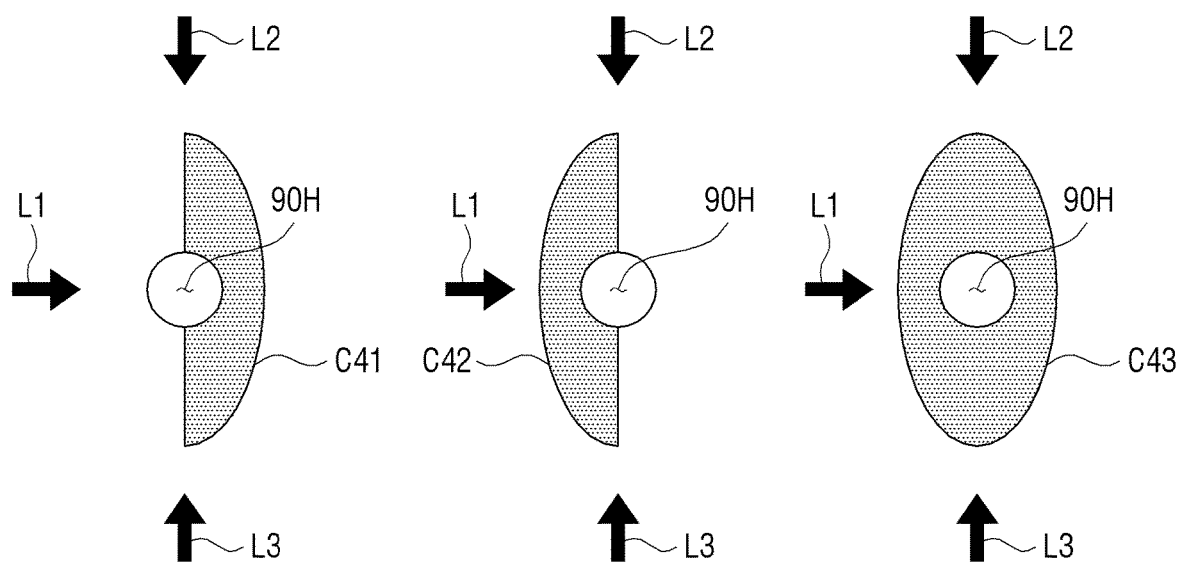
FIGS. 17A-C are diagrams illustrating examples of a pattern change region according to another embodiment.

FIG. 16 is a front view illustrating a light guide plate 90 and light sources 601, 602, and 603 according to another exemplary embodiment and FIGS. 17A-17C are diagrams illustrating examples of a pattern change region according to another exemplary embodiment.

The light guide plate 80 and the light source 60 illustrated in FIG. 11 may be replaced with the light guide plate 90 and the light sources 601, 602, and 603 illustrated in FIG. 16 according to an exemplary embodiment.

The light guide plate 90 having a quadrangular shape may include a first side 901, a second side 902 and a third side 903 coupled to the first side 901 and facing each other, and a fourth side 904 facing the first side 901.

The light sources 601, 602, and 603 may include first to third light source units 601, 602, and 603 configured to irradiate lights to the first to third sides 901, 902, and 903.

The first light source unit 601 may irradiate a first light L1 toward the first side 901, the second light source unit 602 may irradiate a second light L2 toward the second side 902, and the third light source unit 603 may irradiate a third light L3 toward the third side 903.

The light guide plate 90 may include a plurality of insertion holes 90H (FIGS. 17A-17C) and a plurality of diffusion plate support members 200 may be coupled to the plurality of insertion holes 90H.

As illustrated in FIGS. 17A to 17C, the optical pattern P may include pattern change regions C41, C42, and C43, respectively, which surround at least portions of the insertion holes 90H.

The pattern change regions C41, C42, and C43 may be configured of pattern increase regions C41, C42, and C43 having pattern densities larger than those of the remaining regions.

For example, as illustrated in FIG. 17A, the pattern increase region C41 may be arranged toward the fourth side 904 on the basis of the center of the insertion hole 90H to surround the portion of the insertion hole 90H.

The first to third lights L1 to L3 may be incident on the light guide plate 90 through the first to third sides 901, 902, and 903, and the light amount of the light irradiated toward the insertion hole 90H may be minimized in a portion of the insertion hole 90H facing the fourth side 904.

The shadow portion which may be generated in the periphery portion of the insertion hole 90H by the diffusion plate support member 200 may be removed by increasing the light amount in the periphery portion of the insertion hole 90H facing the fourth side 904 through the pattern increase region C41.

As illustrated in FIG. 17B, the pattern increase region C42 may be arranged toward the first side 901 on the basis of the center of the insertion hole 90H to surround the portion of the insertion hole 90H.

The shadow portion which may be generated in the periphery portion of the insertion hole 90H facing the first side 901 may be removed through the pattern increase region C42.

As illustrated in FIG. 17C, the pattern increase region C43 may have a shape which surrounds an outer circumference of the insertion hole 90H and may have a shape which surrounds a periphery portion of the insertion hole 90H.

The shadow portion which may be generated along the outer circumference of the insertion hole 90H may be removed through the pattern increase region C43.

As described above, the display apparatuses 1 and 2 may effectively diffuse the light irradiated toward the diffusion plate 20 from the light guide plates 30, 70, 80, and 90 by forming the optical distance DL between the diffusion plate 20 and the light guide plates 30, 70, 80, and 90 and uniformly guiding the lights of the light guide plates 30, 70, 80, and 90 to the diffusion plate 20 through the inclined portion 521. Accordingly, the sizes of the light guide plates 30, 70, 80, and 90 applied to the display apparatus 1 and 2 according to an exemplary embodiment may be reduced.

The display apparatuses 1 and 2 according to an exemplary embodiment may stably support the diffusion plate 20 and the display panel 10 through the diffusion plate support members 100 and 200.

The display apparatuses 1 and 2 according to an exemplary embodiment may remove the highlight portion and the shadow portion which may be generated by the insertion holes 30H, 70H, 80H, and 90H and the diffusion plate support members 100 and 200 through the optical pattern P including the pattern change region C and thus may prevent the light leakage by the insertion holes 30H, 70H, 80H, and 90H.

Although various exemplary embodiments are separately described, the exemplary embodiments may not be inevitably implemented separately from each other and the configuration and operation of each of the exemplary embodiments may be implemented to be combined with at least one or more other exemplary embodiments.

The foregoing exemplary embodiments and advantages are merely exemplary and are not to be construed as limiting the disclosure. The present teaching can be readily applied to other types of apparatuses. Also, the description of exemplary embodiments is intended to be illustrative, and not to limit the scope and spirit of the claims and their equivalents, and many alternatives, modifications, and variations will be apparent to those skilled in the art. To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A display apparatus comprising:
   a display panel;
   a light guide plate disposed behind the display panel and configured to guide light to the display panel;
   a light source configured to irradiate the light to at least one from among a plurality of sides of the light guide plate;
   a diffusion plate disposed between the display panel and the light guide plate; and
   at least one diffusion plate support member coupled to the light guide plate and configured to support the diffusion plate,
   wherein the light guide plate comprises:
      an optical pattern arranged at a light emitting surface facing the diffusion plate; and
      at least one insertion hole formed in the light emitting surface and into which the at least one diffusion plate support member is inserted,
   wherein the optical pattern comprises a pattern change region which is adjacent to at least a portion of the at least one insertion hole, and
   wherein a width of the pattern change region is reduced toward the light source from the at least one insertion hole.

2. The display apparatus as claimed in claim 1, wherein a length of the display panel is larger than the length of the light guide plate.

3. The display apparatus as claimed in claim 2, further comprising a holder having an inclined portion inclined toward an edge portion of the diffusion plate from the edge portion of the light guide plate.

4. The display apparatus as claimed in claim 3, wherein the diffusion plate is positioned at spaced apart from the light guide plate at a predetermined distance.

5. The display apparatus as claimed in claim 4, wherein each of the at least one diffusion plate support member comprises:
   an insertion part inserted into a respective one from among the at least one insertion hole;
   a cover part which is in contact with the light emitting surface and covers the respective one insertion hole and is larger in a diameter than the diameter of the respective one insertion hole; and
   a support part configured to support the diffusion plate, is smaller in the diameter than the insertion part, and extends from the cover part to the diffusion plate along the predetermined distance.

6. The display apparatus as claimed in claim 1, wherein each of the at least one diffusion plate support member comprises:
   an insertion part inserted into a respective one insertion hole from among the at least one insertion hole;
   a cover part which is in contact with the light emitting surface and covers the respective one insertion hole; and
   a support part configured to support the diffusion plate, and
   wherein the cover part comprises one of: a transparent material and an opaque material.

7. The display apparatus as claimed in claim 6, wherein the pattern change region comprises one of:
   a pattern reduction region in which a pattern density is lower than the pattern density of a remaining region of the pattern change region, and
   a pattern increase region in which the pattern density is higher than that of the remaining region of the pattern change region.

8. The display apparatus as claimed in claim 7, wherein the light guide plate has a quadrangular shape and comprises a first side, a second side a third side which are coupled to the first side and face each other, and a fourth side facing the first side,
   wherein the light source comprises a first light source, a second light source, and a third light source, which are configured to irradiate the light to the first side, the second side, and the third side, respectively, and
   wherein the pattern change region is arranged toward the first side from a center of the respective one insertion hole and surrounds the portion of the respective one insertion hole.

9. The display apparatus as claimed in claim 7, wherein the light guide plate has a quadrangular shape and comprises a first side, a second side and a third side which are coupled to the first side and face each other, and a fourth side facing the first side,
   wherein the light source includes a first light source, a second light source, and a third light source, which are configured to irradiate the light to the first side, the second side, and the third side, respectively, and
   wherein the pattern change region is arranged toward the fourth side from a center of the respective one insertion hole and surrounds the portion of the insertion hole.

10. The display apparatus as claimed in claim 7, wherein the pattern change region is arranged from a center of the respective one insertion hole toward an opposite side from the light source to at least partially surround the respective one insertion hole.

11. The display apparatus as claimed in claim 10, wherein the respective one insertion hole comprises:
    a first portion arranged at a light source side from the center of the insertion hole, and
    a second portion arranged at the opposite side from the light source, wherein the pattern change region surrounds the second portion.

12. The display apparatus as claimed in claim 7, wherein the pattern change region surrounds an outer circumference of the respective one insertion hole.

13. The display apparatus as claimed in claim 12, wherein the pattern change region is configured to have a shape corresponding to a shape of the respective one insertion hole and wherein the respective one insertion hole is arranged in a center portion of the pattern change region.

14. The display apparatus as claimed in claim 7, wherein the pattern change region is arranged at a light source side from a center of the respective one insertion hole to at least partially surround the respective one insertion hole.

15. The display apparatus as claimed in claim 14, wherein the respective one insertion hole comprises:
- a first portion arranged at the light source side from the center of the respective one insertion hole, and
- a second portion arranged at an opposite side from the center of the respective one insertion hole, wherein the pattern change region surrounds the first portion.

16. The display apparatus as claimed in claim 15, wherein the pattern change region has a fan shape which surrounds the first portion.

\* \* \* \* \*